United States Patent
Von Gunten et al.

(10) Patent No.: US 8,845,186 B1
(45) Date of Patent: Sep. 30, 2014

(54) SPIRAL SPRING

(71) Applicant: Manufacture Et Fabrique De Montres Et Chronometres, Ulysse Nardin Le Locie Sa, Le Locie (CH)

(72) Inventors: Stephane Von Gunten, Corcelles (CH); Pierre Gygax, Cortaillod (CH); Lucas Humair, Bevaix (CH)

(73) Assignee: Manufacture et fabrique de montres et chronometres Ulysse Nardin Le Locle SA, Le Locle (CH)

( * ) Notice: Subject to any disclaimer, the term of this patent is extended or adjusted under 35 U.S.C. 154(b) by 0 days.

(21) Appl. No.: 14/281,950

(22) Filed: May 20, 2014

Related U.S. Application Data

(63) Continuation of application No. 13/375,493, filed as application No. PCT/EP2010/061913 on Aug. 16, 2010, now Pat. No. 8,764,282.

(30) Foreign Application Priority Data

Sep. 7, 2009 (CH) ..................................... 1385/09

(51) Int. Cl.
G04B 17/04 (2006.01)
G04B 17/06 (2006.01)

(52) U.S. Cl.
CPC .................................. G04B 17/063 (2013.01)
USPC ........................... 368/175; 368/127; 368/169

(58) Field of Classification Search
USPC ................................. 368/168–178, 127–132
See application file for complete search history.

(56) References Cited

U.S. PATENT DOCUMENTS

| | | | |
|---|---|---|---|
| 30,247 A | 10/1860 | Reed | |
| 65,116 A | 5/1867 | Ramsay | |
| 109,826 A | 12/1870 | Kline | |
| 3,052,084 A * | 9/1962 | Widmer | 368/169 |
| 7,018,092 B2 * | 3/2006 | Muller | 368/140 |
| 7,344,302 B2 | 3/2008 | Musy et al. | |
| 7,889,028 B2 | 2/2011 | Hessler et al. | |
| 7,950,846 B2 * | 5/2011 | Hessler et al. | 368/169 |
| 8,002,460 B2 | 8/2011 | Daout et al. | |
| 8,047,705 B2 | 11/2011 | Hessler et al. | |
| 8,393,783 B2 | 3/2013 | Daout et al. | |
| 2008/0171604 A1 | 7/2008 | Chaudhari et al. | |

FOREIGN PATENT DOCUMENTS

| | | |
|---|---|---|
| CH | 697207 | 6/2008 |
| CH | 700812 | 10/2010 |
| DE | 3216449 | 11/1983 |
| EP | 2063325 | 5/2009 |
| EP | 2151722 | 2/2010 |
| WO | 2004029733 | 4/2004 |
| WO | 2008064714 | 6/2008 |

OTHER PUBLICATIONS

Swiss Search Report, dated Feb. 3, 2010, from corresponding Swiss application.

(Continued)

*Primary Examiner* — Sean Kayes
(74) *Attorney, Agent, or Firm* — Young & Thompson

(57) ABSTRACT

A spiral spring (10) for the movement of a watch, includes a plurality of coplanar leaves (10a, 10b) wound into one another. Furthermore, the inner ends of each leaf are rigidly connected to a single collet (12). The leaves (10a, 10b) and the collar (12) are produced as a single part.

17 Claims, 6 Drawing Sheets

(56) References Cited

OTHER PUBLICATIONS

International Search Report, dated Jan. 14, 2011, from corresponding PCT application.

Suitbertw: "Basel2007* Moser's New Double Straumann Hairspring Escapement", Internet Citation, [Online] Apr. 12, 2007, pp. 1-5, XP002502705, URL: http://basel.watchprosite.com/show-nblog.post/ti-360412/.

* cited by examiner

SPIRAL SPRING

TECHNICAL FIELD

The present invention relates to the field of mechanical horology. It more particularly relates to a spiral spring intended to equip a regulator organ of a mechanical watch.

BACKGROUND OF THE INVENTION

In clocks, pendulums, and mechanical or electronic watches, there is always a regulator organ making it possible, as its name indicates, to regulate the running of the timepiece. In the case of a mechanical watch, the regulator organ is formed by a balance and a spiral spring.

Traditionally, the spiral is a leaf, in general metal, with a rectangular section wound on itself in the shape of a spiral of Archimedes. It is fixed in its center on the balance-staff, by a piece called a collet. The outside of the spiral is fixed to a balance, called balance-cock, by a piece called a balance-spring stud. The balance-spring stud is fixed either directly to the balance-cock, or via a mobile balance-spring stud support.

Such an assembly of a spiral is not optimal for the isochronism of the watch. In fact, the center of the spiral moves during its development, which causes reaction forces at the pivots of the balance-staff. The intensity of the forces exerted on the pivots participate greatly in the isochronism that is generally observed.

Timepiece are known provided with two spirals mounted on the balance-staff, in opposite directions, arranged in different planes. The house H. Moser & Cie offers an escapement provided with two spirals arranged on either side of the balance, in opposite directions. Document EP2063325 proposes a mechanism with two traditional spirals arranged concentrically and coplanarly. It is known that it is difficult to obtain precise characteristics for spirals made traditionally and that therefore, two spirals will most often be different, even just slightly. Thus, the adjustment of such a balance provided with two spirals having different characteristics, and the alignment of the forces exerted by the two spirals, present difficulties. Furthermore, the likely difference between the two spirals makes the result of the forces exerted at the balance-staff, in most cases, non-null and difficult to control.

The present invention therefore aims to propose a spiral making it possible to improve the isochronism of a watch, while remaining simple to implement.

BRIEF DESCRIPTION OF THE INVENTION

More specifically, the invention relates to a spiral spring of a watch movement as defined in claim 1.

Other features of the invention are provided in the dependent claims.

BRIEF DESCRIPTION OF THE DRAWINGS

Other features of the present invention will emerge more clearly upon reading the following description, done in reference to the appended drawing, in which.

DETAILED DESCRIPTION OF THE INVENTION

Figure 1:
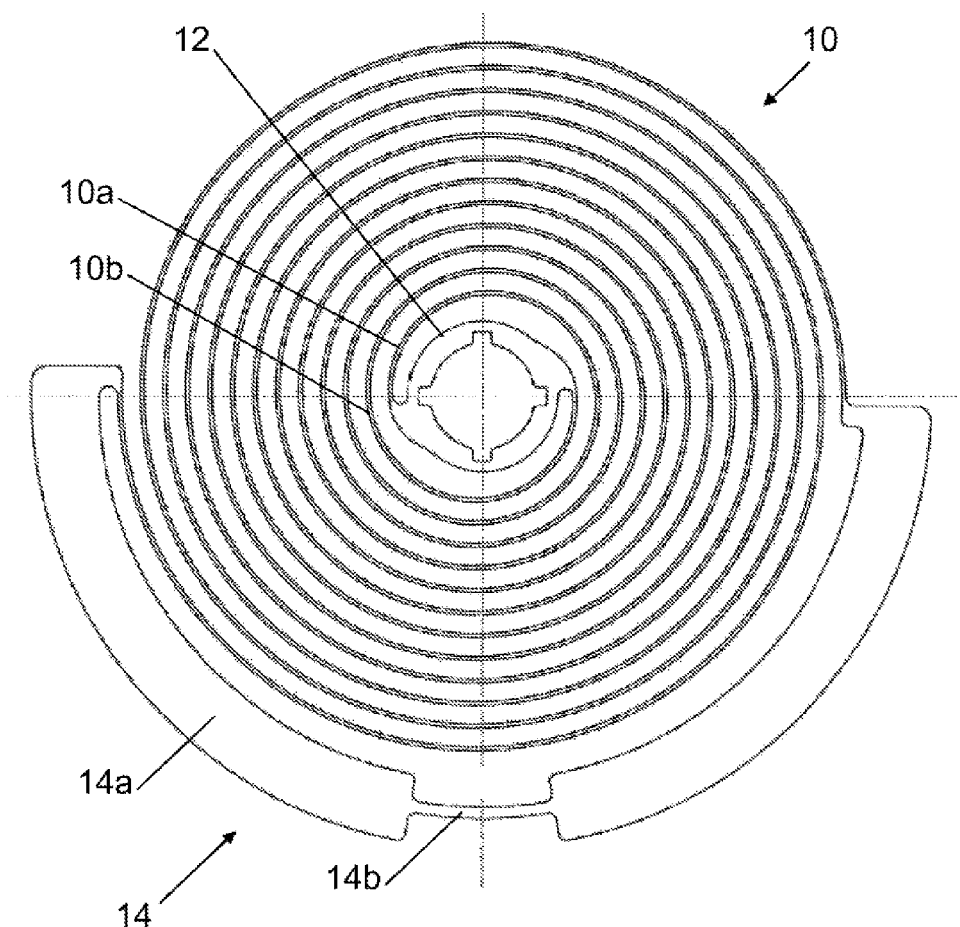
FIGS. 1 to 6 show, in top view, diagrammatic views of different embodiments according to the invention.

FIG. 1 shows a flat spiral spring 10. It comprises a first inner end associated with a collet 12.

Particularly to the invention, from the collet 12, several leaves are deployed, the drawing showing two of them. There is therefore a first 10a and a second 10b leaf, wound in the same plane and in the same direction. The leaves 10a and 10b are wound into one another, the coils of one being inserted between the coils of the other. The first 10a and second 10b leaves are arranged at 180° relative to one another. The leaves are identical, so that the ends of the leaves are situated on a circle and are situated at 180° from one another.

Advantageously, the outer ends of the leaves are connected to each other by a rigid frame 14, i.e. the frame does not (or practically does not) contribute to the elastic torque exerted by the spring. The shape of the frame 14 is circularly symmetrical relative to the center of the spiral. Preferably, the frame follows a circular path, concentric to the spiral.

Typically, as allowed by shaping techniques with silicon-type materials, the collet 12 is made in one piece with the rest of the spiral. Advantageously, for the leaves to have identical elastic characteristics, the two leaves 10a and 10b, the collet 12 and the frame 14 are made in a single piece, monolithically. To that end, the spiral according to the invention can be made from materials that can be shaped using deep etching techniques, particularly silicon-based spirals, in particular made from monocrystalline silicon, potentially covered by a layer of silica, but also spirals made from diamond, obtained by growth then deep etching, or spirals made from DCS (Diamond Coated Silicon), i.e. silicon spirals covered with diamond.

Owing to the symmetrical arrangement of two identical leaves 10a and 10b, each of the leaves exerts a force on the balance-staff offsetting the force exerted by the other leaf. Thus, the reactions on the staff are minimized, or practically null, which makes it possible to improve the isochronism of the oscillator.

The frame 14 is arranged to be able to support an attachment organ, preferably a balance-spring stud, to connect the spiral to a balance-spring stud fixed on the movement. In the embodiment of FIG. 1, the frame has a portion with a width adapted to receive a slotted balance-spring stud, known by those skilled in the art. More specifically, the frame has a wide zone 14a and a slimmer zone 14b to receive the balance-spring stud. The latter is fixed to the frame using an adapted technique, such as adhesion or welding, chosen by one skilled in the art.

Figure 2:
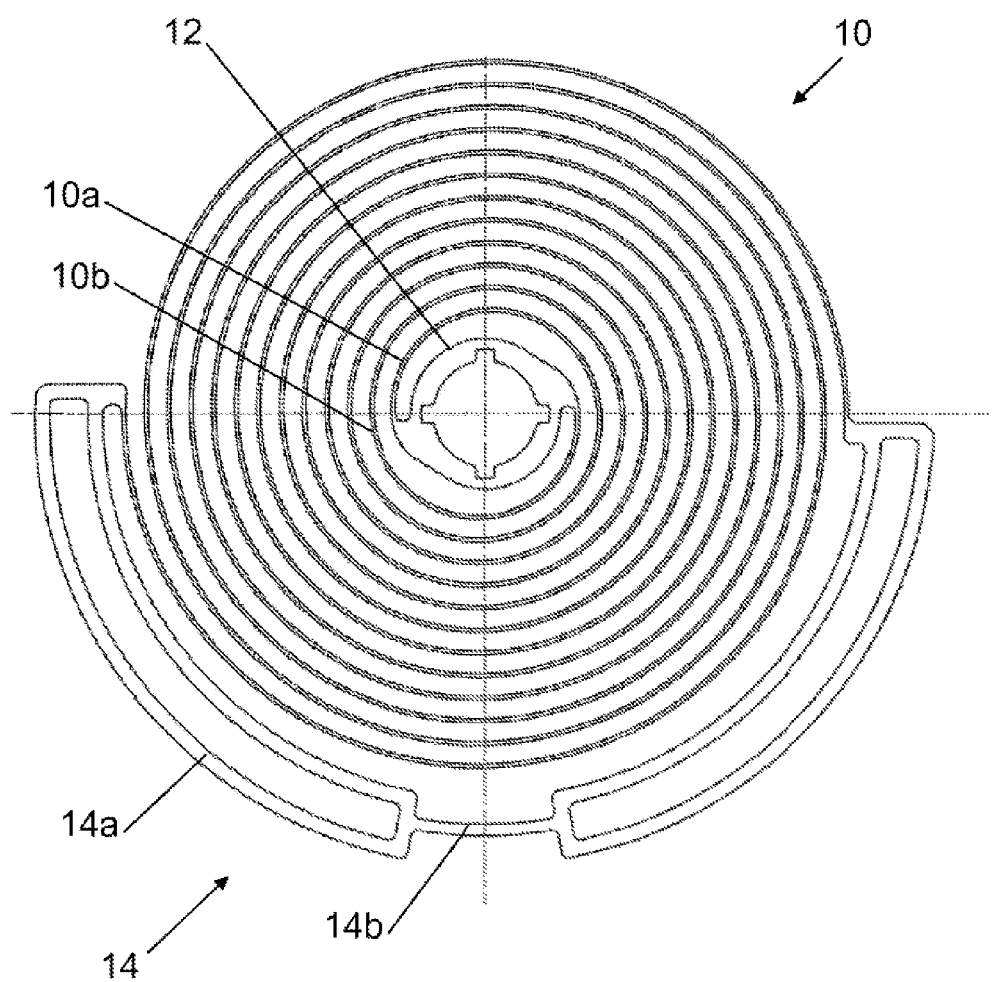
Figure 3:
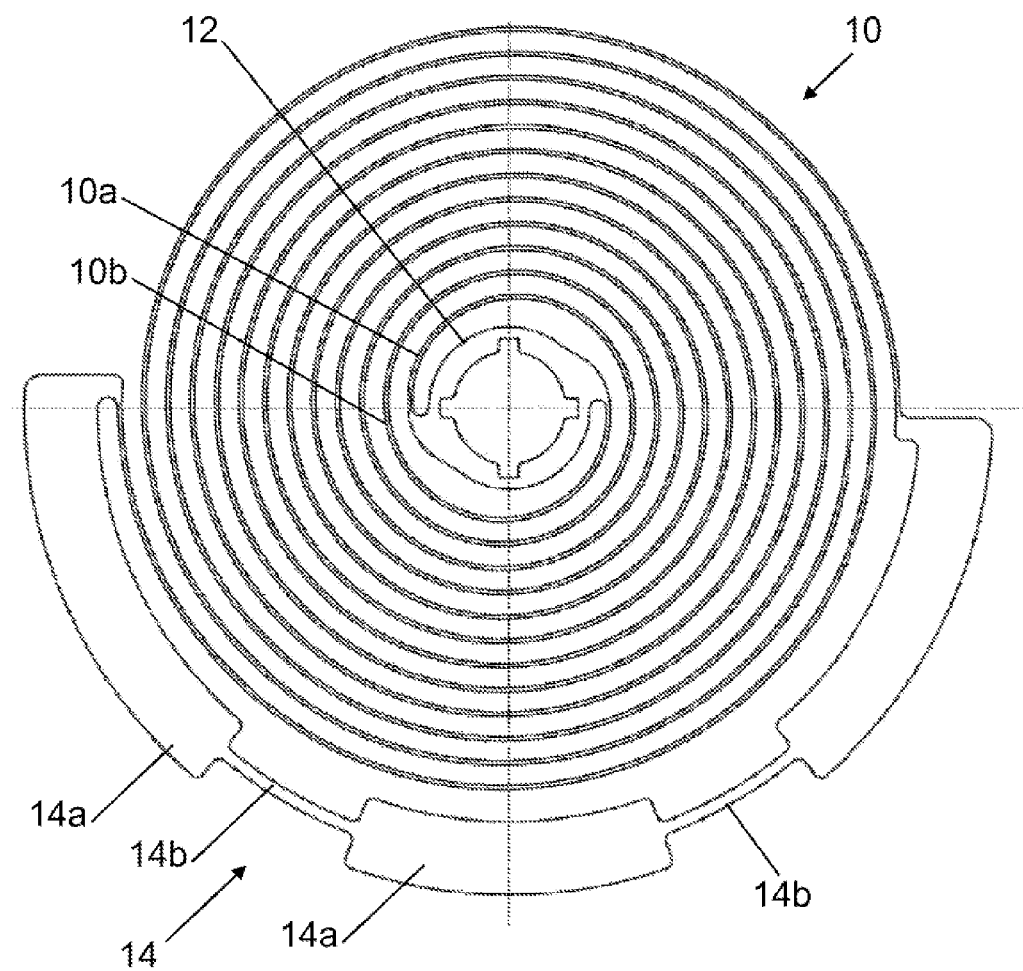
Figure 4:
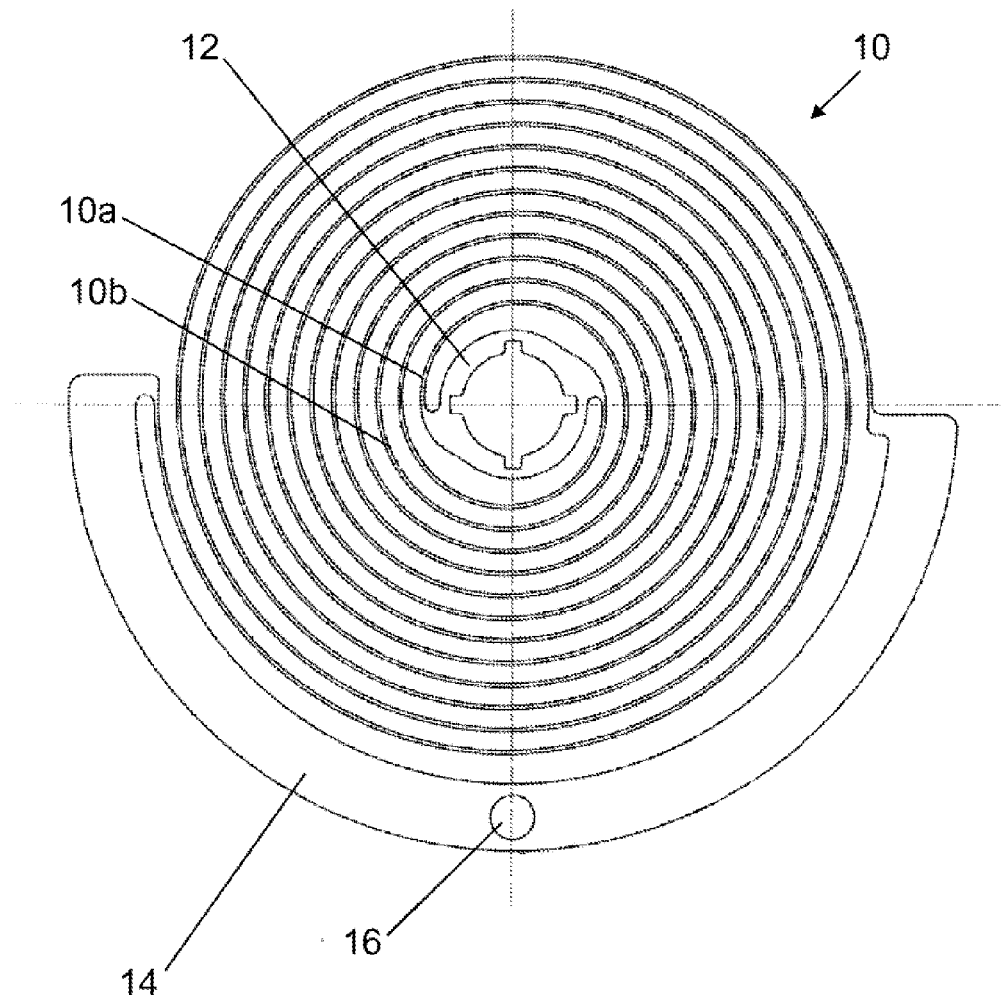

FIGS. 2 to 5 propose different embodiments to produce the frame 14. In FIGS. 2 to 4, the frame 14 is semi-circular and connects the two ends of the leaves arranged at 180°. In FIG. 2, the wide zones 14a of the frame are hollowed out, which makes it possible to lighten the spiral in the outer zone thereof, which is always interesting to limit the forces on the balance-spring stud in case of impact.

In FIG. 3, the frame 14 has several slim zones 14b, making it possible to position the balance-spring stud at several locations around the frame, which can provide flexibility for the construction of the movement.

Figure 5:
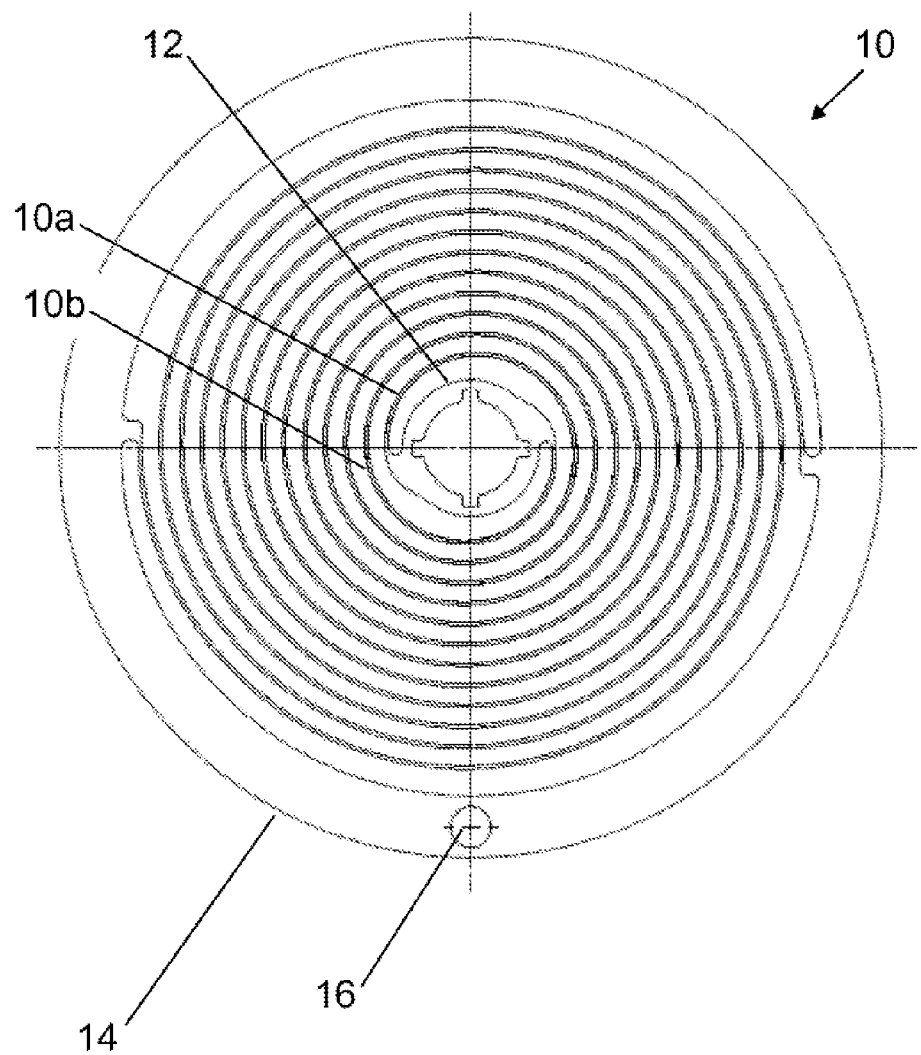

FIG. 4 proposes a frame provided with a hole 16 to receive a non-slotted balance-spring stud, which can be housed and fixed in the hole. The frame 14 of FIG. 5 is arranged in the same way, but makes a full circle by connecting the outer ends of the leaves by their two sides. The distribution of the masses is thus completely symmetrical. It will be noted that, even in the configuration where the frame is provided with a hole, the frame could be hollowed out. Several holes can also be arranged on the frame.

It will also be noted that the function of the frame can be fulfilled by a balance-cock including several balance-spring studs (one balance-spring stud per leaf), making it possible to fix the ends of the leaves. In that case, the frame, as such, is eliminated and only the collet and the leaves are then monolithic.

Although the figures only show examples in which the spiral spring 10 includes two leaves, more can be provided. It is thus possible to have n identical leaves, distributed at 360°/n around the collet, the outer ends also being distributed at 360°/n. Such an arrangement makes it possible to improve the distribution of the leaves and forces around the balance-staff, and therefore allows better compensation.

In such a case, with n leaves, a frame 14 in the shape of an arc of circle defines an angle of 360°/n, or a multiple of that value, as chosen by the person skilled in the art. A complete circular frame is also possible.

Each leaf being wound between the coils of other leaves, it is understood that, for a spiral with a given dimension, increasing the number of leaves causes, on the one hand, a reduction in the active length of each leaf. Thus, relative to a conventional spiral occupying a surface area S, provided with a single leaf whereof the active length is L and thickness e (the thickness being the dimension of the leaf in the plane of the spiral) and with pitch p between the coils, a spiral according to the invention with n leaves of thickness e, pitch p for each coil, occupying the same surface S, each leaf will have an active length of length L/n. This consequently increases the stiffness of the leaf, but that can be offset by decreasing the thickness of each leaf, which makes it possible to increase the active length and decrease the stiffness. It is thus easy to obtain a total desired torque in compliance with the torques obtained with conventional spiral springs. It is also possible to consider making spirals occupying a larger surface area in order to obtain leaves with the desired length. From a practical perspective, spirals with 2, 3 or 4 leaves will be preferred.

Figure 6:
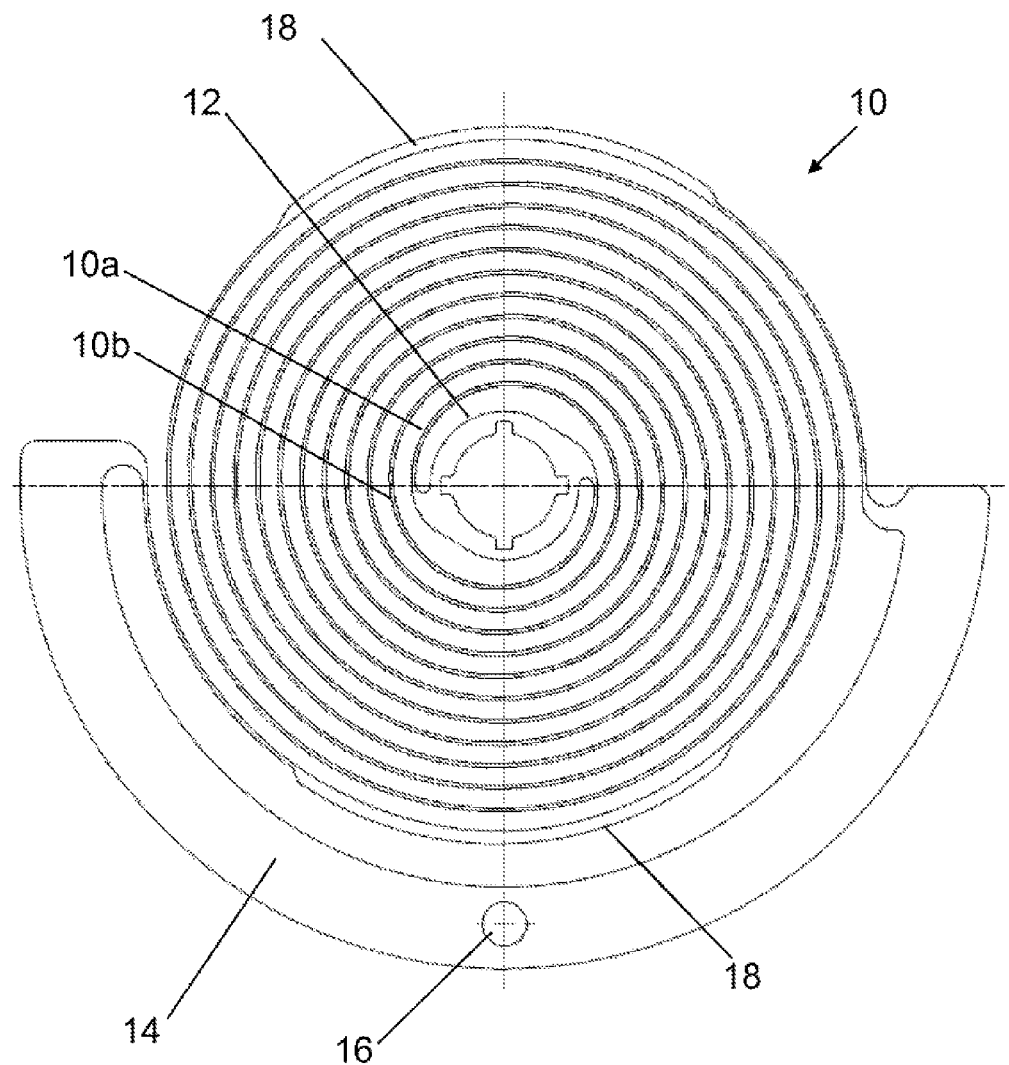

FIG. 6 proposes a spiral spring 10 whereof the outer coil of each leaf is provided with a reinforcement 18 making it possible to correct the centering of the spiral and to bring the center of gravity of the active part to the action center of the elastic torque, i.e. to the center of the spiral. Such a reinforcement 18 makes it possible to improve the concentricity of the development of the spiral and to further reduce the reactions at the pivot. It will be noted that the reinforcement 18 in itself does not participate in defining the elastic torque of the spiral. As shown in FIG. 6, the pitch separating the last spire is at a constant distance from the next-to-last coil, including at the reinforcement. It would also be possible to consider the distance between the last coil and the next-to-last coil being smaller than the pitch separating the other coils, particularly at the reinforcement.

This description was provided solely as a non-limiting illustration of the invention and one skilled in the art can also provide various alternatives following directly from the description provided above, without going beyond the scope defined by the claims. In particular, the pitch of each leaf can be constant, as shown in the drawing, but it can also vary. Furthermore, the balance-spring stud can be replaced by another fixing mode, in particular a screw to secure the frame directly with the balance-cock.

What is claimed is:

1. A spiral spring of a watch movement, comprising:
   a single collet;
   a rigid frame provided with at least one portion to receive an attachment organ; and
   a plurality of coplanar leaves wound into one another,
   wherein inner ends of each leaf are secured to the single collet,
   wherein the leaves and the collet are made monolithically,
   wherein outer ends of each leaf are connected to each other by the rigid frame,
   wherein said frame, the leaves, and the collet being made monolithically and define a single monolithic piece, and
   wherein the frame includes hollowed-out zones arranged to lighten the spiral spring in an outer zone thereof, and
   wherein the frame includes wide zones and at least one slim zone, said slim zone being intended to receive a balance-spring stud to attach the spiral spring to the watch movement, wherein the hollowed-out zones are within the wide zones.

2. The spiral spring according to claim 1, wherein a pitch of each leaf is constant.

3. The spiral spring according to claim 1, wherein a pitch of each leaf is variable.

4. The spiral spring according to claim 1, wherein the frame includes at least one hole intended to receive a balance-spring stud to attach the spiral spring to the watch movement.

5. The spiral spring according to claim 1, wherein the frame forms a circle whereof the center of the circle is the center of the spiral.

6. The spiral spring according to claim 1, wherein the frame forms an arc of circle, with an angle that is a multiple of 360°/n.

7. The spiral spring according to claim 1, wherein said spiral spring is made with a base of silicon.

8. The spiral spring according to claim 1, wherein said spiral spring is made with a base of monocrystalline silicon, covered with a layer of silica.

9. The spiral spring according to claim 1, wherein said spiral spring is made with a base of monocrystalline silicon, covered with a layer of diamond.

10. The spiral spring according to claim 1, wherein said spiral spring is made with a base of diamond.

11. The spiral spring according to claim 1, wherein the plural coplanar leaves define n leaves offset from each other by 360°/n.

12. The spiral spring according to claim 11, wherein n is one of the group consisting of 2, 3 and 4.

13. The spiral spring according to claim 11, wherein a pitch of each leaf is constant.

14. The spiral spring according to claim 11, wherein a pitch of each leaf is variable.

15. The spiral spring according to claim 11, wherein the frame includes wide zones and at least one slim zone, said slim zone being intended to receive a balance-spring stud to attach the spiral spring to the watch movement.

16. The spiral spring according to claim 11, wherein a last coil of the leaves includes a reinforcement arranged so as to bring a center of gravity of an active part to an action center of the elastic torque.

17. The spiral spring according to claim 11, wherein the frame forms a circle whereof the center of the circle is the center of the spiral.

* * * * *